United States Patent [19]
Albrecht

[11] Patent Number: 5,960,933
[45] Date of Patent: Oct. 5, 1999

[54] CONVEYOR BELT FOR NON-SLIP MATERIAL HANDLING

[75] Inventor: Brian Albrecht, Winnetka, Ill.

[73] Assignee: Tetra Laval Holdings & Finance, SA, Pully, Switzerland

[21] Appl. No.: 08/876,125

[22] Filed: Jun. 23, 1997

[51] Int. Cl.[6] .................................................. B65G 17/46
[52] U.S. Cl. ............................................................ 198/689.1
[58] Field of Search ........................... 198/689.1, 844.1, 198/846, 847

[56] References Cited

U.S. PATENT DOCUMENTS

| | | |
|---|---|---|
| 1,062,579 | 5/1913 | Aylsworth . |
| 3,295,810 | 1/1967 | Kintish . |
| 3,375,917 | 4/1968 | Irving, Jr. .............................. 198/689.1 |
| 3,602,364 | 8/1971 | Maglio et al. . |
| 3,628,654 | 12/1971 | Haracz . |
| 3,877,592 | 4/1975 | Krenke et al. .................... 198/689.1 X |
| 3,985,096 | 10/1976 | Guimbretiere . |
| 4,389,064 | 6/1983 | Laverriere . |
| 4,457,420 | 7/1984 | Ducloux . |
| 4,620,826 | 11/1986 | Rubio et al. . |
| 4,664,166 | 5/1987 | Benisti .............................. 198/689.1 X |
| 5,149,045 | 9/1992 | Szarka . |

FOREIGN PATENT DOCUMENTS

| | | | |
|---|---|---|---|
| 3001531 | 7/1981 | Germany | .............................. 198/689.1 |

*Primary Examiner*—James R. Bidwell
*Attorney, Agent, or Firm*—Welsh, Katz, Ltd.

[57] ABSTRACT

A method and a conveyor system for conveying a container along a continuous belt without substantial transverse movement is disclosed in the present invention. The conveyor system has a pair of rotating cylinders and a continuous belt having a plurality of compressible cavities thereon. The cavities are compressed as the belt engages with the cylinders thereby creating a potential vacuum. Before expansion of the cavity, a container is placed above the cavity which has a vacuum exerted thereon when the cavity is expanded. In this manner, the container is secured in a set position as it is conveyed from one end of the belt to another end. This allows an action to be performed on the container during the conveyance such as the printing of a digital image on a surface of the container.

11 Claims, 4 Drawing Sheets

CONVEYOR BELT FOR NON-SLIP MATERIAL HANDLING

BACKGROUND OF THE INVENTION

1. Field of the Invention

The present invention generally relates to conveyor belts. Specifically, the present invention relates to a conveyor belt for conveying a product in a substantially restricted movement.

2. Description of the Related Art

Containers being processed either for printing or packaging purposes must be conveyed from one site to another. The containers may be pre-formed or in a final configuration. This conveyance may be accomplished in a number of manners. The most traditional is a continuous conveyor belt which is driven by a drum on at least one end. In this traditional manner, a container is placed on the belt and conveyed from a first site to a second site. However, such a system does not tightly grasp the container thereby preventing any action to be performed on the container during conveyance.

To alleviate this problem, some conveyors have installed guide rails along the sides to restrict the movement of a container during conveyance. However, this solution further complicates the conveyance since the guide rails may interfere with any action to be performed on the container, and necessitates a mechanism for placing the container within the guide rails and for allowing the container to exit from the guide rails.

What is needed is a method to convey a container without substantial transverse movement of the container which easily allows an action to be performed on the container during conveyance from one site to another, or allows the container to be maintained in a set orientation from one site to another. What is also needed is a method to apply a solution to this problem on current machinery without substantial modification of machines.

BRIEF SUMMARY OF THE INVENTION

The present invention resolves the problems conveying a container from one site to another without substantial transverse movement by providing a specially designed continuous belt which may be substituted for continuous conveyor belts on current packaging and printing machines. The present invention uses mechanically induced vacuums to grasps containers being conveyed on an uniquely designed continuous conveyor belt.

One aspect of the present invention is a conveyor system having a pair of rotating cylinders and a continuous conveyor belt. The conveyor system is characterized in that the conveyor belt has a plurality of compressible cavities capable of exerting a vacuum on a container placed upon a set of the cavities.

Another aspect of the present invention is an apparatus for printing a digital image on a container. The apparatus includes a conveyor system for conveying the container through the apparatus, and means for printing a digital image on the container. The conveyor system includes a pair of rotatable cylinders and a continuous belt having a plurality of compressible cavities. Each of the cylinders rotate about a fixed axis and the distance between them define the length of the conveyor system. The continuous belt has a predetermined thickness and a top surface and a bottom surface.

Another aspect of the present invention is a method for conveying a container from one site to another without substantial transverse motion of the container. The first step of the method is providing a continuous conveyor belt having a plurality of cavities thereon. The next step is providing a series of containers to be conveyed from one site to another. The next step is compressing a cavity of the plurality of cavities as the cavity engages the first rotating cylinder thereby creating a potential vacuum. The next step is moving a container of the series of containers over the compressed cavity. The next step is expanding the cavity as the cavity disengages from the first rotating cylinder thereby exerting a vacuum on the container. The next step is moving the vacuumly attached container along the length of the continuous conveyor belt. The final step is compressing the cavity as the cavity engages with the second rotatable cylinder thereby removing the vacuum from the container.

It is a primary object of the present invention to provide a conveyor system for conveying a series of containers without substantial transverse motion of the containers during the conveyance.

It is an additional object of the present invention to provide a conveyor system for conveying a series of containers with may have a digital image printed on the surface of the container as the container is being conveyed on the conveyor system without substantial transverse motion.

It is an additional object of the present invention to provide a method for conveying a series of containers without substantial transverse motion of the containers during the conveyance.

Having briefly described this invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

Several features of the present invention are further described in connection with the accompanying drawings in which:

There is illustrated in FIG. 1 a side perspective view of the conveyor system of the present invention;

Figure 2B:
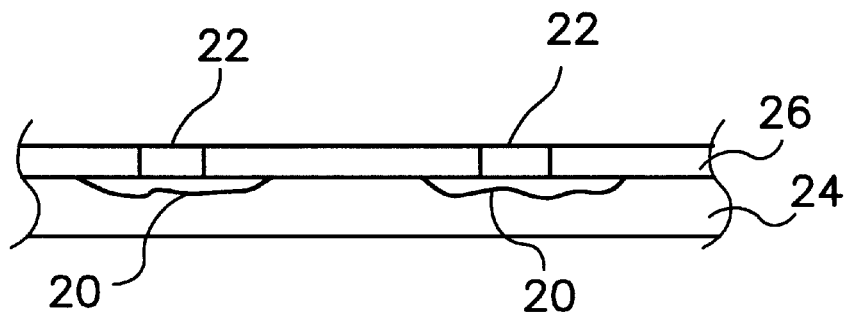
Figure 2A:
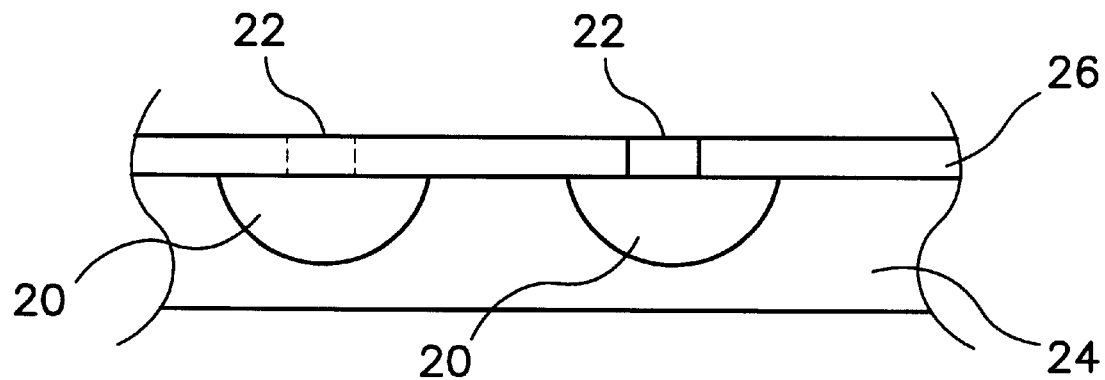
Figure 3:
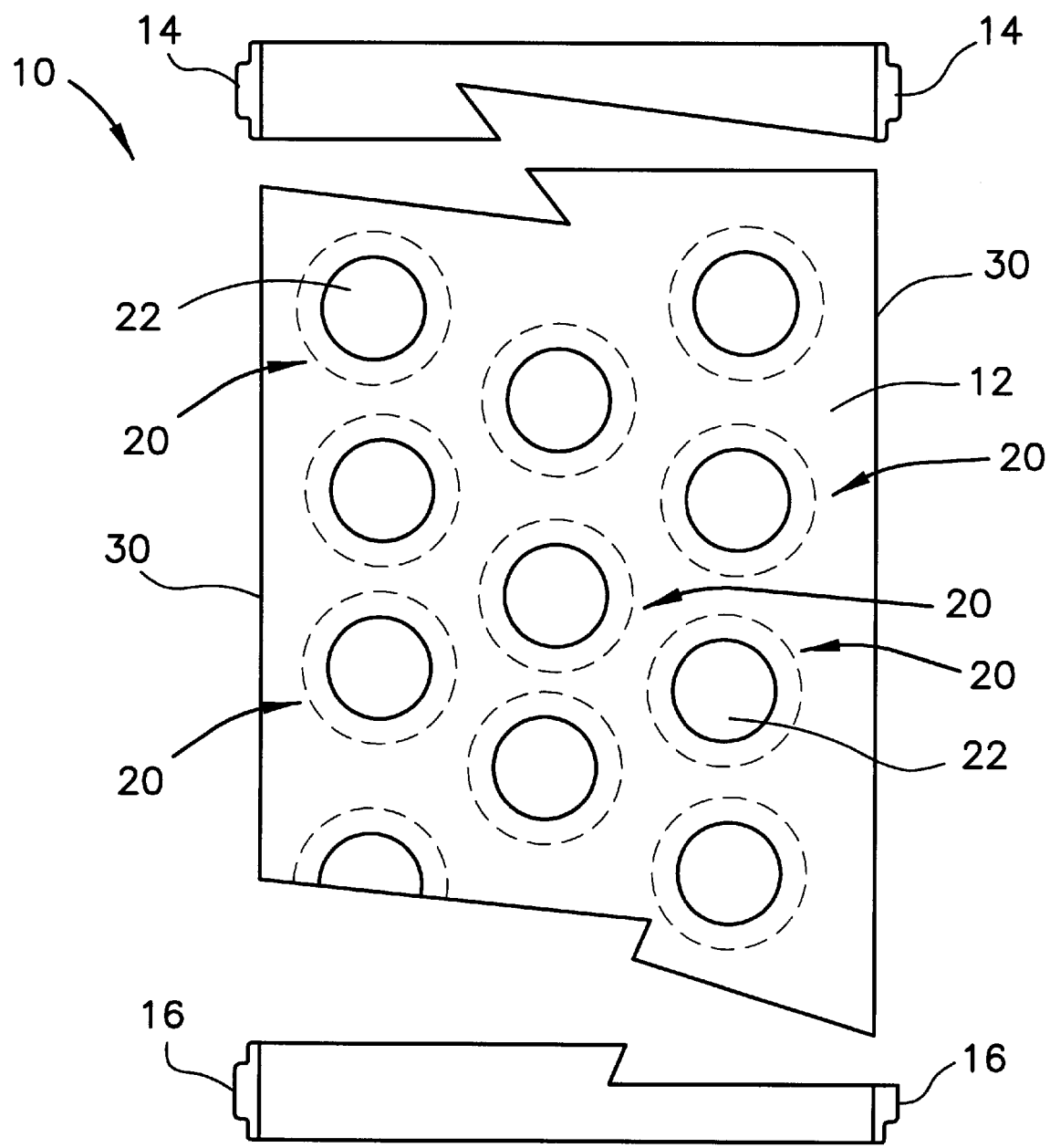

There is illustrated in FIG. 2A a side perspective of the continuous conveyor belt of the present invention in an uncompressed state;

There is illustrated in FIG. 2B a side perspective of the continuous conveyor belt of the present invention in a compressed state;

There is illustrated in FIG. 3 a top perspective of the conveyor system of the present invention.

Figure 4:
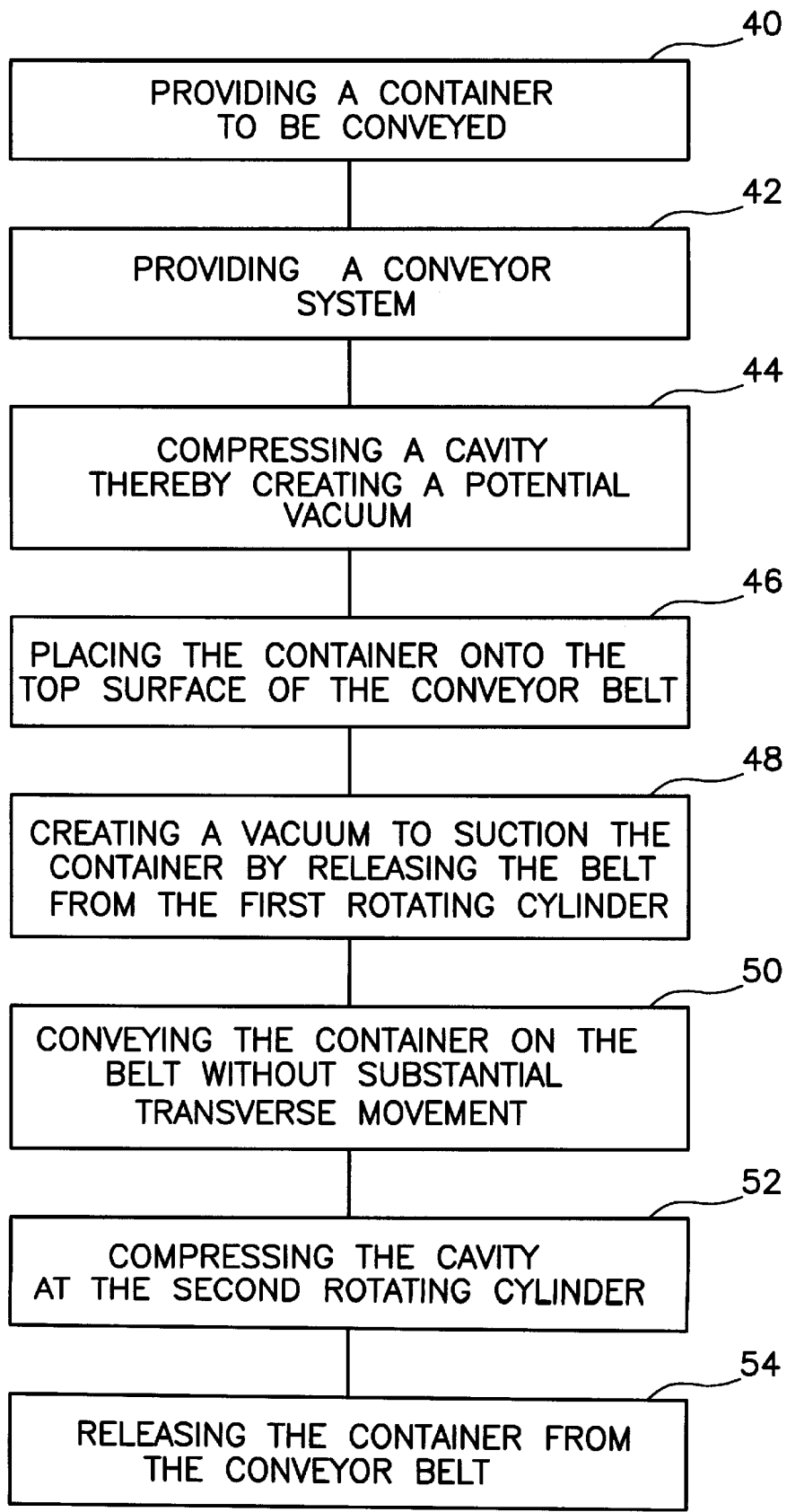

There is illustrated in FIG. 4 a flow diagram of the method of conveying a container without substantial transverse movement of the present invention.

DETAILED DESCRIPTION OF THE INVENTION

Figure 1:
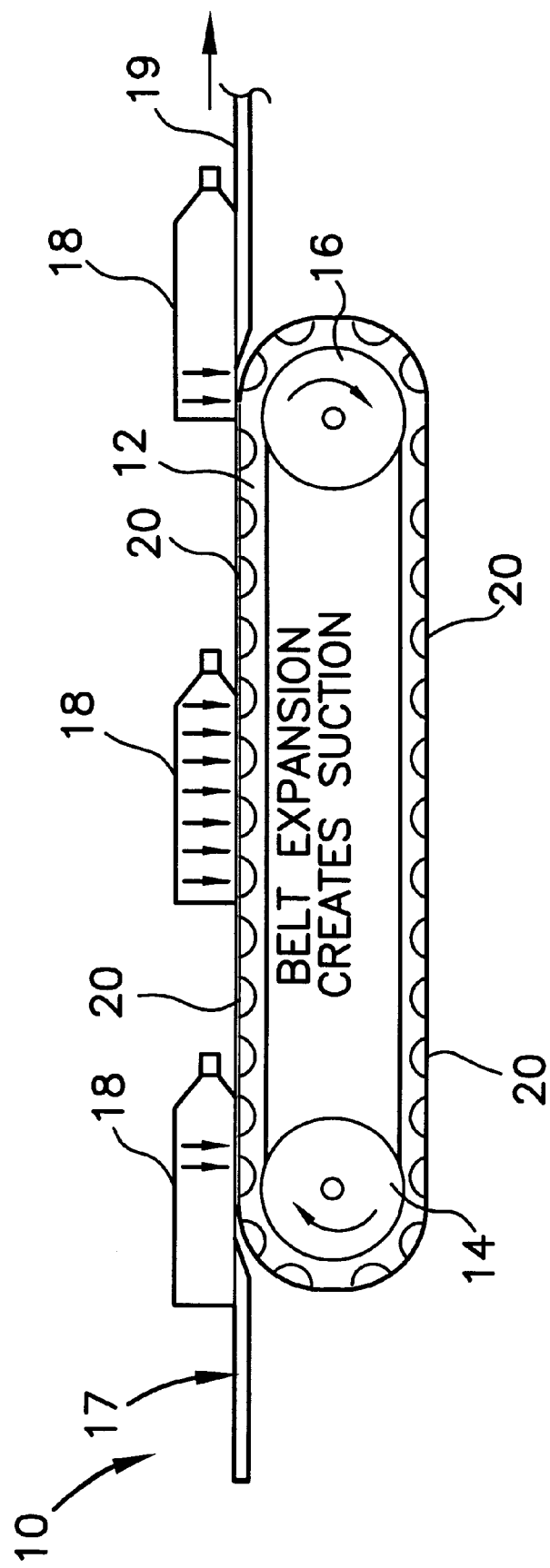

As shown in FIG. 1, the conveyor system is generally designated 10. The conveyor system 10 includes a continues conveyor belt 12, a first rotatable cylinder 14 and a second rotatable cylinder 16. The conveyor system is utilized for conveying containers 18 from one site to another. On a packaging machine, not shown, the conveyor system 10 may be utilized to convey a preformed container 18 from a loading station to a filling station. The initial transport position 17 and the final transport position 19 may be a chute, another conveyor belt, or the like. On an apparatus for printing a digital image on a container, not shown, the conveyor system 10 may be utilized to convey the container under the printheads and through a curing station. Such an apparatus for printing a digital image is described in copending U.S. patent application Ser. No. 08/599,513, which is hereby incorporated by reference in its entirety.

The continuous belt 12 has a plurality of compressible cavities 20 which are positioned a predetermined distance from each other. The distance is determined by the particular use of the belt 12. The distance of the cavities 20 is farther apart for lighter container than the distance of the cavities for a heavier container. For example, if the container is filled, a greater number of cavities will be needed to exert a sufficient vacuum on the filled container than if the container was empty. In this example, the distance between cavities for the filled container is considerable shorter in order to have a sufficient number of cavities to exert the required vacuum on the filled container.

As shown in FIGS. 2A and 2B, the continuous belt 12 is composed of a rigid outer layer 26 and an elastic inner layer 24. The plurality of compressible cavities 20 is located on the elastic inner layer 24. The rigid outer layer has a plurality of orifices 22, with each of the orifices 22 corresponding to a compressible cavity 20. The orifices 22 being in air flow communication with the corresponding cavity 20 and the atmosphere/air-environment. The size of the orifice and the cavity will vary on the size and shape of the containers 18. The container may be a blow molded bottle, a cylindrical PET bottle, a flexible pouch, a gable top carton, a parallel-epipedic container such as the TETRA BRIK®, or the like. The rigid outer layer 26 may be covered with a rubber or urethane coating to improve friction and suction properties. The rigid outer layer 26 and the elastic inner layer 24 may be permanently bonded to each other at all areas around the plurality of compressible cavities 20.

There is illustrated in FIG. 3 a top perspective of the conveyor system of the present invention. As shown in FIG. 3, the continuous belt 12 has a plurality of compressible cavities 20 positioned a predetermined distance from each other. Each of the plurality of compressible cavities 20 has a corresponding orifice 22. The distance between each of the plurality of cavities 20 may vary depending on the type of container 18 being conveyed on the conveyor system 10. For example, a typical two-pint blow molded HDPE (high density polyethylene) bottle should have three rows of cavities 20 with the rows on the edges 30 of the continuous conveyer belt 12 being parallel to each other, and the center row of cavities 20 aligned midway between cavities 20 on the edge rows. Another example might have each of the plurality of cavities 20 having a diameter of 3 millimeters and being spaced 1.25 centimeters from each other. It should be apparent to those skilled in the pertinent art that the grid pattern of the plurality of compressible cavities 20 may take various forms without departing from the scope and spirit of the present invention.

There is illustrated in FIG. 4 a flow diagram of the method of conveying a container without substantial transverse movement of the present invention. The first step of the method is to provide a container 18 to be conveyed which is indicated at step 40. At step 42, a conveyor system 10 is provided for conveying of the container 18. At step 44, each of the plurality of cavities 20 lying on a portion of the continuous belt 12 which is engaged with the first cylinder 14 are compressed as shown in FIG. 2B. By compressing the cavities 20, a potential vacuum is created for suctioning of a container 18. At step 46, a container 18 is placed onto the continuous conveyor belt 12 at the front of the belt 12 nearest first rotating cylinder 14. At step 48, a vacuum is created by releasing or moving the belt 12 from first cylinder 14. As the belt 12 moves away from the first cylinder 14, the previously compressed cavities 20 expand to create a vacuum if a container 18 is above the cavity 20 as it expands. For example, if the compressed cavity is at atmospheric pressure (1 atm), then during expansion of the cavity 20, the effective volume of the cavity is greatly increased thereby reducing the pressure. For example, since $p_1V_1=p_2V_2$, and if $V_2=2\ V_1$, then $½\ p_1=P_2$ where $p_1$ and $V_1$ are the compressed cavity pressure and volume, and $P_2$ and $V_2$ are the expanded/uncompressed cavity pressure and volume. Thus, in this simple example the expanded cavity pressure is half that of the compressed cavity pressure. However, other factors such as temperature variations, composition of the air and material properties of the belt 12 will effect the pressure. However, this macroscopic example should suffice to demonstrate how a vacuum is created on the conveyor system and method of the present invention. If a greater vacuum is necessary, the cavity may be enlarged to increase the vacuum.

Returning to FIG. 4, at step 50, a container 18 is conveyed along the belt 12 without substantial transverse movement due to the vacuum exerted on the container 18 by each of the plurality of cavities 20 under the container 18. As the container 18 is being conveyed on the belt 12, the container 18 may be acted upon by an apparatus either above or to the side of the belt 12. One action is the printing of a digital image onto a surface of the container 18 as it is conveyed along the belt 12. Other actions might involve scanning the container 18, irradiating the container 18 with ultraviolet radiation, manipulating the shape of the container 18, attaching an additional article to the container 18, or the like. Additionally, the conveyor system 10 may be utilize to convey a container which is oriented into one position at the initial transport position 17 to the final position 19 while maintaining the container 18 in the set orientation. At step 52, the cavity 20 is again compressed as the belt 12 engages with the second cylinder 16. At step 54, the container 18 is released from the belt 12 since the vacuum is terminated by the compression of the cavity 20.

Although the belt 12 is shown as lying in a horizontal plane, it is well within the scope of the present invention to have the belt 12 at an angle to the initial transport position 17. This angle may vary from 0 to 180 degrees from the initial transport position 17. Thus, the conveyor system 10 may be utilized to carry a container upside down. The container may be a pre-formed container such as a carton blank or a sheet of material, or the container 18 may be in a final configuration such as a PET bottle.

In practicing the current invention, the conveyor system 10 may be substituted for a typical conveyor system or integrated on a new machine. One particular use of the present invention is for printing a digital image on a container as described in copending application number 08/599,513. Another use for the present invention may be with blow molded bottle fabricating machine subsequent to the actual fabricating process. Still another use for the present invention is with a sterilization station on a packaging machine where the container 18 is irradiated with ultraviolet light. It should be apparent to those skilled in the art that the present invention may utilized with any container being conveyed along a fixed distance where it is necessary for the container to travel without substantial transverse movement.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims:

I claim as my invention:

1. A conveying system for conveying a series of containers without substantial transverse movement of each of the containers relative to the conveyance, the conveyor system comprising:

first and second rotatable cylinders, each of the cylinders rotating about a fixed axis, the first and second rotatable cylinders a predetermined distance apart thereby defining the length of the conveyor system;

a continuous belt engaged and tensioned with each of the rotatable cylinders, the continuous belt having a predetermined thickness, the continuous belt having a plurality of compressible cavities, each of the plurality of compressible cavities positioned a fixed distance from each other, the belt including a rigid outer layer and an elastic inner layer, wherein the plurality of compressible cavities is formed in the elastic inner layer, the rigid outer layer having a plurality of orifices formed therein disposed above corresponding ones of the plurality of compressible cavities, each of the plurality of orifices being in flow communication with a corresponding one of the compressible cavities and the atmosphere;

wherein movement of the continuous belt compresses each of the plurality of compressible cavities when the continuous belt is in contact with one of the rotatable cylinders thereby creating a vacuum for grasping a container on the continuous belt, as the continuous belt disengages from the first cylinder allowing for the expansion of each of the plurality of compressible cavities while the container is above each of the corresponding plurality of compressible cavities, and ceasing the vacuum and thus releasing a container as the continuous belt engages the second rotatable cylinder.

2. The conveyor system according to claim 1 wherein the plurality of compressible cavities extend over the entirety of the continuous belt.

3. The conveyor system according to claim 1 wherein each of the plurality of compressible cavities is a half of a sphere having a cross-section diameter greater than that of the cross-section diameter of each of the plurality of orifices.

4. The conveyor system according to claim 1 wherein the container is selected from the group consisting of a blow-molded bottle, a pre-formed PET bottle, a pre-formed carton blank, a pre-formed sheet of material for parallelepiped packages, a flexible pouch and a formed gable-top carton.

5. The conveyor system according to claim 1 wherein the conveyance may be at an angle of 0 to 180 degrees relative to an initial transport position.

6. A method for conveying a container from one site to another without substantial transverse motion of the container relative to the conveyance, the method comprising the following steps:

providing a continuous conveyor belt having a rigid outer layer and an elastic inner layer, the elastic inner layer having a plurality of compressible cavities thereon, the rigid outer layer having a plurality of orifices formed therein overlying the compressible cavities, the continuous conveyor belt engaged with a first rotatable cylinder on one end and a second rotatable cylinder on the other end, the distance between the first and second rotatable cylinders defining a length of the continuous conveyor belt;

providing a series of containers to be conveyed from one site to another;

compressing a cavity of the plurality of cavities as the cavity engages the first rotating cylinder thereby creating a potential vacuum;

moving a container of the series of containers onto the rigid outer layer over the compressed cavity;

expanding the cavity as the cavity disengages from the first rotating cylinder thereby exerting a vacuum on the container;

moving the vacuumly attached container along the length of the continuous conveyor belt; and compressing the cavity as the cavity engages with the second rotatable cylinder thereby removing the vacuum from the container.

7. The method according to claim 6 wherein the plurality of compressible cavities extend over the entirety of the continuous belt.

8. The method according to claim 6 wherein each of the plurality of compressible cavities is a half of a sphere having a cross-section diameter greater than that of the cross-section diameter of each of the plurality of orifices.

9. The method according to claim 6 wherein the container is selected from the group consisting of a blow-molded bottle, a pre-formed PET bottle, a pre-formed carton blank, a preformed sheet of material for parallelepiped packages, a flexible pouch and a formed gable-top carton.

10. The method according to claim 6 wherein the conveyance may be at an angle of 0 to 180 degrees relative to an initial transport position.

11. The method according to claim 6 further comprising the step of printing a digital image on the container as the container is conveyed along the length of the continuous conveyor belt.

* * * * *